US008655409B2

(12) United States Patent
Linehan et al.

(10) Patent No.: US 8,655,409 B2
(45) Date of Patent: Feb. 18, 2014

(54) ANTENNA WITH CELLULAR AND POINT-TO-POINT COMMUNICATIONS CAPABILITY

(75) Inventors: Kevin E. Linehan, Rowlett, TX (US); David K. Tappin, Upper Steelend (GB)

(73) Assignee: CommScope Inc. of North Carolina, Hickory, NC (US)

(*) Notice: Subject to any disclaimer, the term of this patent is extended or adjusted under 35 U.S.C. 154(b) by 728 days.

(21) Appl. No.: 12/191,099

(22) Filed: Aug. 13, 2008

(65) Prior Publication Data

US 2009/0069055 A1 Mar. 12, 2009

Related U.S. Application Data

(60) Provisional application No. 60/969,084, filed on Aug. 30, 2007.

(51) Int. Cl.
*H04M 1/00* (2006.01)
*H01Q 3/00* (2006.01)
*H01Q 21/00* (2006.01)

(52) U.S. Cl.
USPC .......................... 455/562.1; 343/766; 343/853

(58) Field of Classification Search
USPC .......................... 455/561, 562.1, 272–279.1; 343/822–824, 857, 861, 750, 757, 797, 343/810, 816, 853, 895, 714, 724, 751, 343/805; 370/343, 334
See application file for complete search history.

(56) References Cited

U.S. PATENT DOCUMENTS

| | | | | |
|---|---|---|---|---|
| 5,097,647 | A | 3/1992 | Sopik et al. | |
| 6,573,875 | B2 * | 6/2003 | Zimmerman et al. | 343/853 |
| 7,015,871 | B2 * | 3/2006 | Gottl et al. | 343/882 |
| 7,642,988 | B1 * | 1/2010 | Johnson et al. | 343/878 |
| 2004/0038714 | A1 | 2/2004 | Rhodes et al. | |
| 2004/0162115 | A1 | 8/2004 | Smith et al. | |
| 2005/0134512 | A1 | 6/2005 | Gottl et al. | |
| 2006/0003808 | A1 * | 1/2006 | Haskell et al. | 455/562.1 |
| 2006/0192716 | A1 * | 8/2006 | Kim | 343/766 |
| 2006/0244675 | A1 * | 11/2006 | Elliot et al. | 343/853 |
| 2007/0085744 | A1 * | 4/2007 | Engel | 343/700 MS |
| 2007/0241979 | A1 * | 10/2007 | Yang | 343/765 |

FOREIGN PATENT DOCUMENTS

| | | |
|---|---|---|
| DE | 201 11 727 U1 | 10/2001 |
| JP | 2001-230719 | 8/2001 |
| JP | 2002-223106 | 8/2002 |
| JP | HEI 05-002421 | 1/2005 |
| JP | HEI 05-078018 | 3/2005 |
| WO | WO 2005/062419 | 7/2005 |

OTHER PUBLICATIONS

PCT/US2008/073040 International Seach Report for related application.
PCT/US2008/073040 Written Opinion for related application.

(Continued)

*Primary Examiner* — San Htun
(74) *Attorney, Agent, or Firm* — Husch Blackwell LLP

(57) ABSTRACT

An antenna includes one or more radiofrequency radiating elements for forming a radiofrequency beam and a point-to-point antenna for forming a point-to-point beam. The point-to-point element may be fixed with respect to the antenna's radome. Adjustment of the point-to-point element orientation may be achieved using the antenna mount to adjust the orientation of the point-to-point element and radome together.

13 Claims, 3 Drawing Sheets

(56) References Cited

OTHER PUBLICATIONS

Translation of Office Action for related Japanese Patent Application No. 2010-523026 dated Dec. 20, 2012.

Supplementary European Search Report for relation App. No. 08797808.6 dated May 31, 2013.

* cited by examiner

ANTENNA WITH CELLULAR AND POINT-TO-POINT COMMUNICATIONS CAPABILITY

FIELD OF THE INVENTION

The invention relates to antennas, particularly to base station antennas including radiofrequency and backhaul radiating elements.

BACKGROUND TO THE INVENTION

Cellular base station antennas generally include one or more radiofrequency radiating elements which form one or more beams in one or more frequency bands. These radiating elements communicate with mobile devices within the region covered by the base station antenna.

Signals are also transmitted to and received from the base station antenna over a backhaul link. This may be a microwave point-to-point link, in which case the microwave antenna is generally provided separately to the base station antenna. This requires separate radomes for the base station and microwave antennas, a communication link between the two antennas and separate installation of the two antennas.

It is an object of the invention to provide an antenna including both radiofrequency and backhaul radiating elements, such that both the radiofrequency and backhaul elements can be installed in a single unit and housed in a single radome, without sacrificing performance of either the radiofrequency or backhaul communications.

EXEMPLARY EMBODIMENTS

There is provided an antenna including both a cellular antenna and a point-to-point antenna. The point-to-point antenna is fixed with respect to the radome.

According to one exemplary embodiment there is provided a communications antenna including:

a cellular antenna including one or more radiofrequency radiating elements for forming a radiofrequency beam having an adjustable angle;

a point-to-point antenna; and a radome;

the point-to-point antenna and the radome being arranged such that the spatial arrangement of the point-to-point antenna with respect to the radome is fixed.

According to another exemplary embodiment there is provided a method of installing a communications antenna in a cellular network, the communications antenna including:

a cellular antenna including one or more radiofrequency radiating elements for forming a radiofrequency beam having an adjustable angle;

a point-to-point antenna; and a radome;

the point-to-point antenna and the radome being arranged such that the spatial arrangement of the point-to-point antenna with respect to the radome is fixed;

the method including aligning the point-to-point antenna and radome with a remote antenna so as to enable a point-to-point communications link.

According to a further exemplary embodiment there is provided a communications antenna including:

a cellular antenna including one or more radiofrequency radiating elements for forming a radiofrequency beam having an adjustable angle;

a backhaul antenna; and a radome;

the backhaul antenna and the radome being arranged such that the spatial arrangement of the backhaul antenna with respect to the radome is fixed.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DESCRIPTION OF EMBODIMENTS OF THE INVENTION

Figure 1:
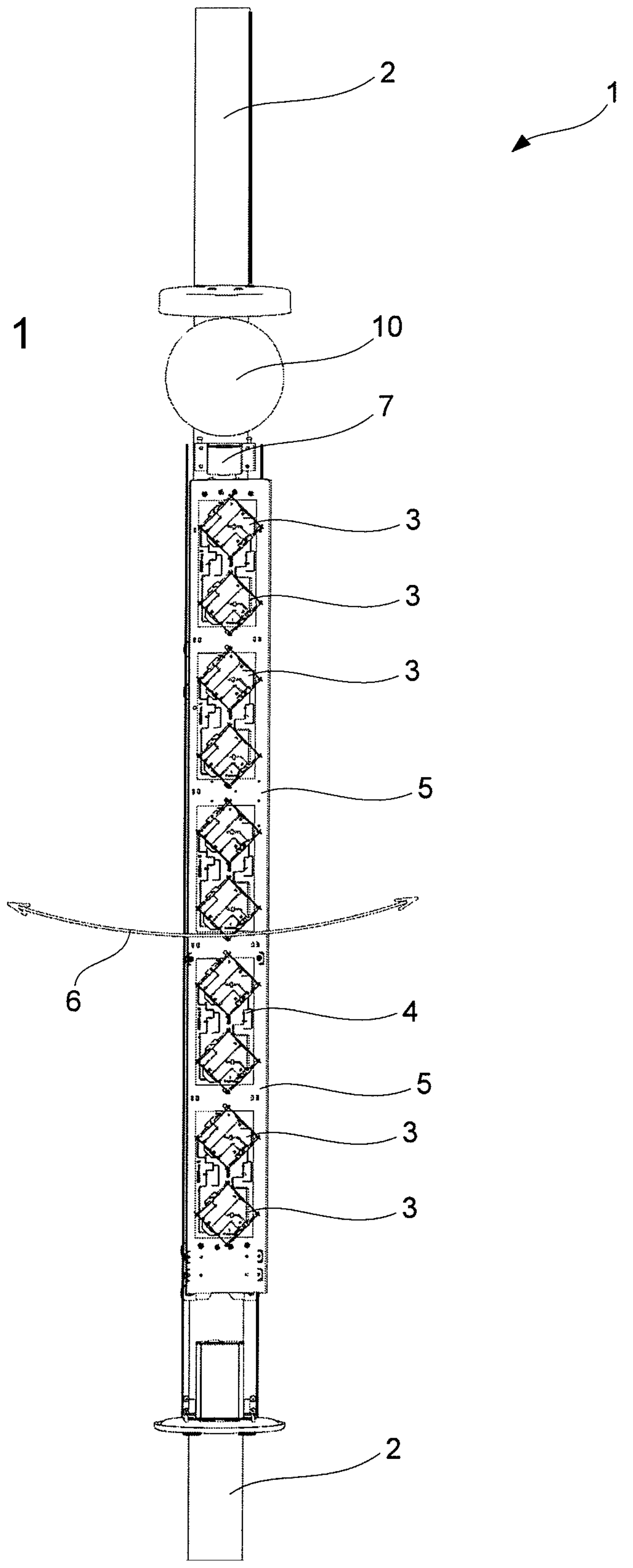
FIG. 1 is a front view of an antenna without its radome.
Figure 2:
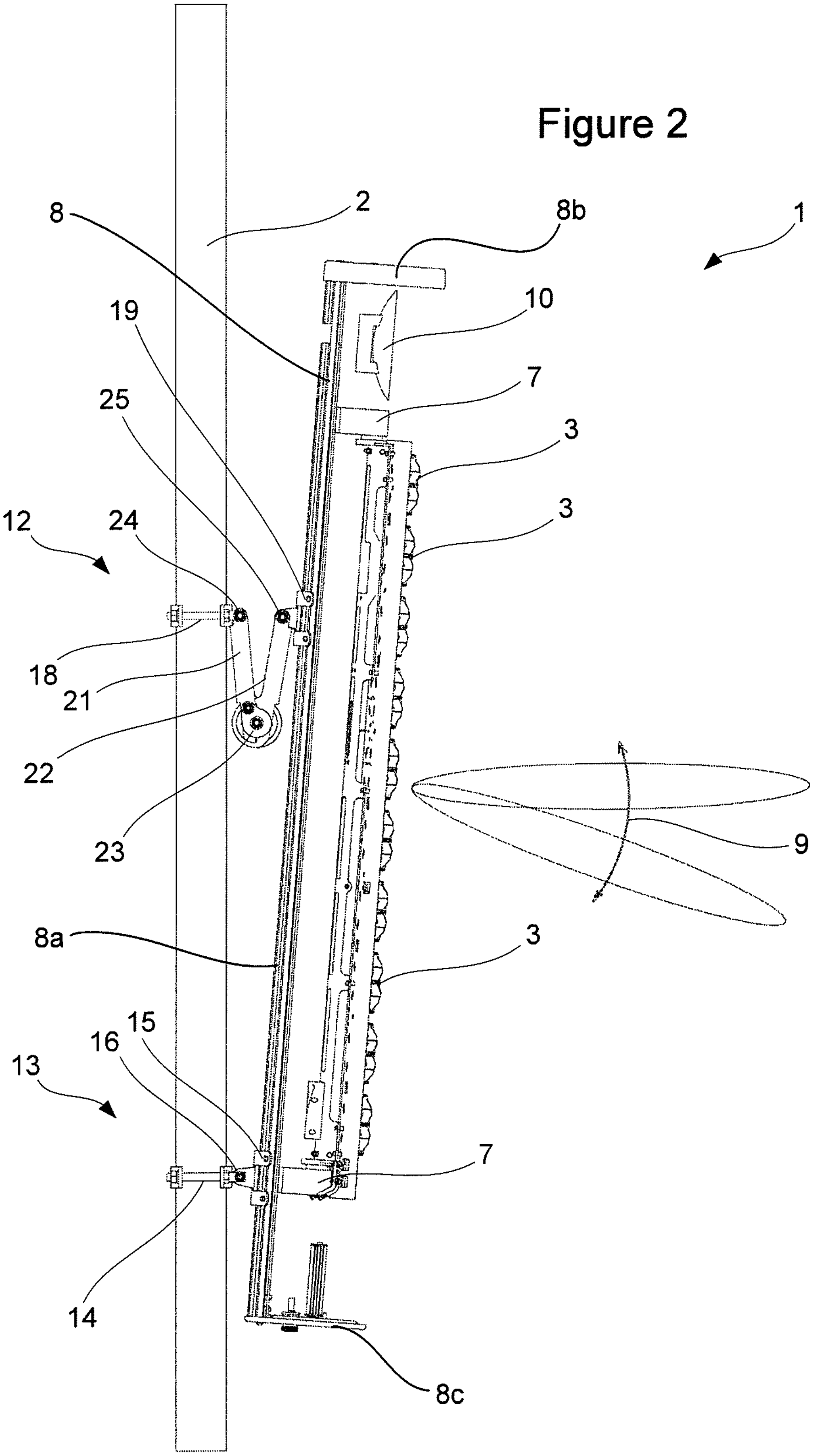
FIG. 2 is a side view of the antenna of FIG. 1.

FIG. 1 is a front view and FIG. 2 is a side view of a communications antenna 1. The antenna 1 is mounted on a support 2, which is shown as a pole but could be any supporting surface such as an antenna tower, building or other suitable support.

The communications antenna 1 includes a cellular antenna including radiofrequency radiating elements 3. One or more such elements may be provided. The radiofrequency radiating elements 3 may be suitable for transmitting and/or receiving signals in a cellular communications network. In particular, the radio frequency radiating elements 3 may be suitable for use in a cellular base station antenna.

A radiofrequency feed network 4 may feed signals to and/or from the radio frequency radiating elements 3. A ground plane 5 may be situated behind the radio frequency radiating elements 3.

In use, the radiofrequency radiating elements 3 produce a radiofrequency beam which has an adjustable azimuth angle, as depicted by the arrow 6. Adjustment of the radiofrequency beam angle may be achieved by electrical or mechanical adjustment. For example, the ground plane 5 may support the radio-frequency elements 3 and be mounted at each end on a rotating mount 7 within the antenna housing 8. This allows the radio-frequency elements 3 to be rotated within the housing so as to alter the azimuth angle of the radiofrequency beam.

Figure 3:
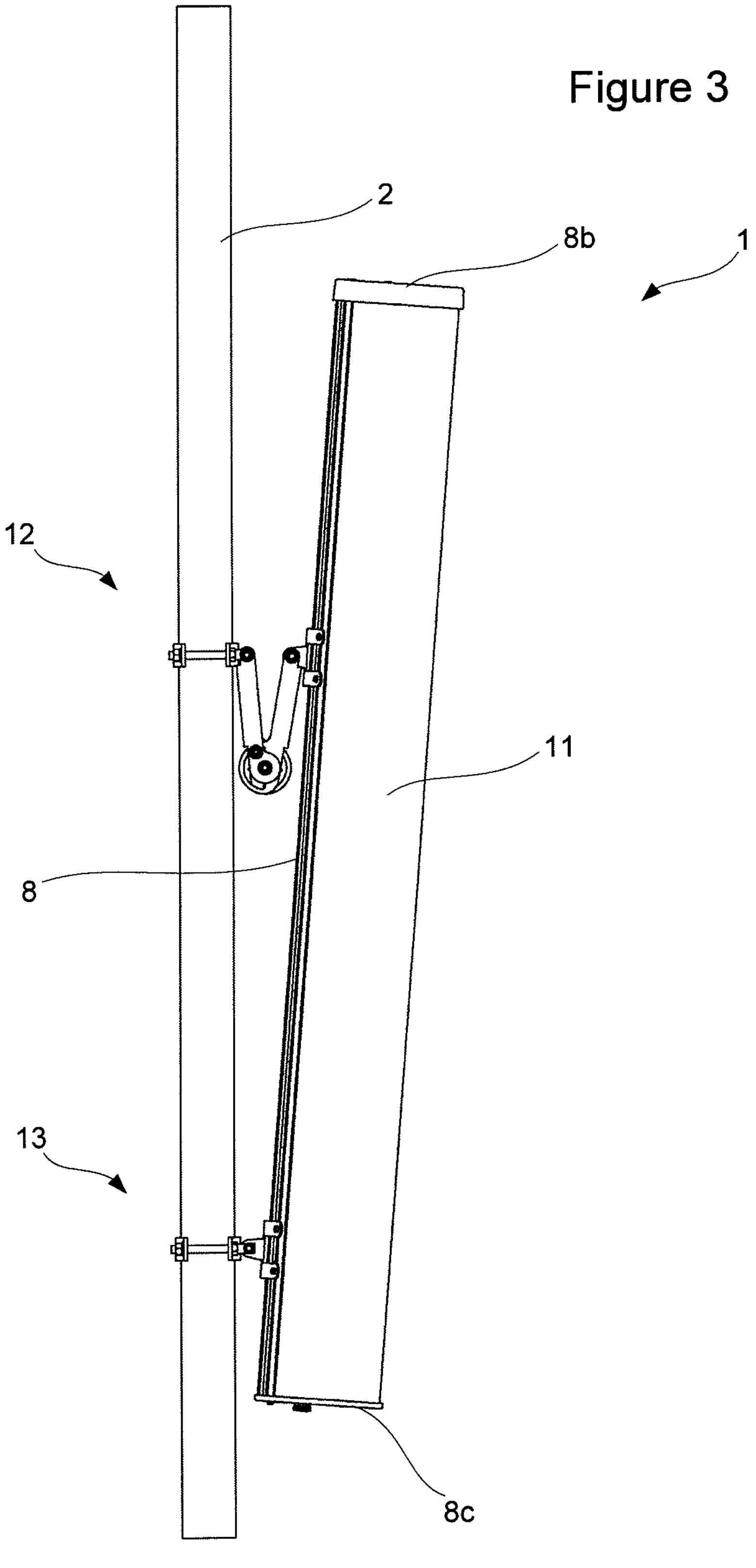
FIG. 3 is a view similar to that of FIG. 2, showing the antenna with the radome in place.

The antenna housing 8 may include a back wall 8*a*, a top wall 8*b* and a bottom wall 8*c*, as shown in FIG. 2. The antenna housing 8 may be configured to receive an antenna radome 11, as shown in FIG. 3, such that the electrical components of the antenna are contained within an enclosure formed by the housing 8 and radome 11. Thus, rotation of the groundplane 5 on the mounts 7 may result in movement of the groundplane with respect to the radome.

Also, the feed network may include a number of phase shifters for adjusting the phase of signals supplied to the individual radiating elements 3. This allows adjustment of the downtilt angle of the radiofrequency antenna beam, as depicted by the arrow 9 in FIG. 2. Thus, adjustment of the downtilt angle may be achieved by electrical means and adjustment of the azimuth angle may be achieved by mechanical means.

In general, adjustment of the azimuth and downtilt angles may be achieved by any combination of mechanical and electrical adjustment. For example, both azimuth and downtilt angles may be adjusted by electrical phase shifters.

Furthermore, arrangements for adjusting the beamwidth of the radio-frequency beam may also be provided. For example, power dividers for dividing power supplied to the various radio frequency elements 3 may be used to adjust the beamwidth.

The angle and beamwidth of the radiofrequency beam may be adjusted remotely, as discussed for example in the Applicant's US patent application publication nos. US2004/0038714A1, entitled "Cellular antenna", and US2006/0244675A1, entitled "A cellular antenna and systems and methods therefor". The disclosures of these documents are incorporated by reference herein.

The communications antenna 1 also includes a point-to-point antenna 10. This point-to-point antenna may be suitable for forming a backhaul communications link. The point-to-point antenna 10 may be a microwave antenna, such as a microwave dish or a planar microwave array. The point-to-point antenna 10 may be a highly directional antenna.

The point-to-point antenna 10 is fixed with respect to the antenna radome 11 (FIG. 3). This means that the point-to-point antenna 10 is oriented by orienting the point-to-point antenna 10 and radome together. This fixed arrangement may be achieved by fixing both the radome and the point-to-point antenna 10 to an antenna structure, or by fixing them together directly. Thus, orientation of the point-to-point antenna 10 and radome may or may not require orientation of the entire communications antenna 1.

Having the point-to-point antenna in fixed relation to the radome simplifies the effects of the radome on the radiation used for point-to-point communication. Relative motion of the point-to-point antenna with respect to the radome is likely to have unpredictable and negative effects on the radiation pattern and return loss of the point-to-point antenna. This is important, as the point-to-point antenna 10 may operate at higher frequencies such as 18-23 GHz. To overcome these effects by design is challenging, especially at higher frequencies.

Furthermore, the point-to-point antenna 10 may operate in a license band in which the radiation pattern must meet strict regulatory pattern envelopes. The effects of relative motion between the point-to-point antenna and the radome would then be particularly problematic.

Such relative motion between the point-to-point antenna and the radome would also require additional components and moving parts.

FIG. 2 shows that the communications antenna 1 may be mounted to the support 2 using a two-part mounting arrangement 12, 13, which may be situated outside the antenna housing.

The bottom mount 13 may include a bracket 14 for mounting to the support 2; a second bracket 15 for mounting to the antenna 1; and a pivoting connection 16 joining the two brackets 14, 15.

The top mount 12 may include a bracket 18 for mounting to the support 2; a second bracket 19 for mounting to the antenna 1; and a two-legged connection joining the two brackets 18, 19. The two-legged connection may include a first leg 21 joined to a second leg 22 at a central pivot 23. Each leg 21, 22 is joined to one of the brackets at a pivot 24, 25. The central pivot 23 includes a tightener (not shown) for fixing the two legs 21, 22 at the appropriate angle.

This mounting arrangement 12, 13 allows the downtilt orientation of the antenna to be adjusted. The top mount 12 can be adjusted by altering the angle of the two legs 21, 22 while the bottom mount 13 allows the antenna to rotate around pivot 16.

Similarly, the azimuth orientation of the antenna can be adjusted either using the brackets 14, 18 mounted on the support 2 or using a further pivot.

Thus, the orientation of the antenna can be fixed in both downtilt and azimuth using the mounting arrangement 12, 13 for mounting the antenna to a support 2. The mounting arrangement may allow the antenna orientation to be adjusted after attachment to a support, or may simply allow the antenna to be fixed with a desired orientation.

As the point-to-point antenna 10 is fixed with respect to the radome, orientation of the point-to-point antenna 10 may be achieved by orienting the radome and point-to-point element together using the mounting arrangement 12, 13. This orientation will generally be performed at installation of the antenna, although changes in the network may necessitate reorientation at a later time.

Once the antenna is mounted using the mounting arrangement 12, 13, the radiofrequency beam is oriented using electrical or mechanical adjustment as described above.

Thus, in general, the antenna housing and radome may be mounted to a support using an antenna mounting arrangement. The groundplane for the radiofrequency elements may support those elements and may be mounted to the antenna housing, possibly so as to allow rotation of the groundplane within the antenna housing and radome. The point-to-point antenna may be mounted to the antenna housing and/or radome.

The cellular antenna and point-to-point antenna may both be contained within the radome 11.

The methods and antennas described above allow for easy installation of point-to-point and radiofrequency radiators in a single unit. Alignment of the point-to-point element with the radome allows the antenna to meet the strict radiation pattern requirements for point-to-point links, which are typically microwave links. In contrast, systems with an adjustable point-to-point antenna within a radome (i.e. where the orientation of the point-to-point element is not fixed with respect to the radome) are likely to suffer from unpredictable and/or negative effects on the radiation pattern and return loss of the point-to-point antenna. The Applicant's antenna allows use of a point-to-point antenna embedded in a radiofrequency antenna, without the need to address the variable effects caused by adjustment of the point-to-point antenna with respect to the radome.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. A communications antenna including:

i. a cellular antenna including one or more radiofrequency radiating elements for forming a radiofrequency beam, the cellular antenna having a mechanically adjustable azimuth angle;

ii. a point-to-point antenna;

iii. a radome enclosing the cellular antenna and the point-to-point antenna; and iv. at least one adjustable mounting bracket allowing orientation of both the radome and the point-to-point antenna with respect to a remote antenna to enable a point-to-point communications link;

the point-to-point antenna and the radome being arranged such that the spatial arrangement of the point-to-point antenna with respect to the radome is fixed, and the mechanically adjustable azimuth angle of the cellular antenna allows the spatial arrangement of the cellular antenna and the radome to vary.

2. A communications antenna as claimed in claim 1 wherein the point-to-point antenna is a microwave antenna.

3. A communications antenna as claimed in claim 2 wherein the microwave antenna is a microwave dish.

4. A communications antenna as claimed in claim 2 wherein the microwave antenna is a planar microwave array.

5. A communications antenna as claimed in claim 1 wherein the point-to-point antenna is configured to enable a backhaul communications link.

6. A communications antenna as claimed in claim 1, being a cellular base station antenna.

7. A communications antenna as claimed in claim 1, wherein the radiofrequency beam has an adjustable downtilt angle.

8. A communications antenna as claimed in claim 1 including one or more phase shifters for adjusting the phases of signals transmitted to or received from the radiofrequency radiating elements so as to adjust the angle of the radiofrequency beam.

9. A communications antenna as claimed in claim 1 further comprising a housing, wherein the cellular antenna is mounted to the housing with a rotating mount.

10. A communications antenna as claimed in claim 1 wherein the cellular antenna further comprises a groundplane positioned behind the radiofrequency radiating elements, the groundplane being rotatable relative to the radome.

11. A communications antenna as claimed in claim 1 wherein the point-to-point antenna is a backhaul antenna.

12. A method of installing a communications antenna in a cellular network, the communications antenna including:

i. a cellular antenna including one or more radiofrequency radiating elements for forming a radiofrequency beam having an adjustable angle;

ii. a point-to-point antenna;

iii. a radome enclosing the cellular antenna and the point-to-point antenna; and iv. a mounting arrangement attaching the communications antenna to a support; the point-to-point antenna and the radome being arranged such that the spatial arrangement of the point-to-point antenna with respect to the radome is fixed;

the method including adjusting the mounting arrangement to move the communications antenna with respect to the support to align the point-to-point antenna and radome with a remote antenna so as to enable a point-to-point communications link; and rotating the cellular antenna with respect to the radome to adjust azimuth angle of the radiofrequency beam.

13. A method as claimed in claim 12, further including adjusting the angle of the radiofrequency beam so as to align that beam with a desired coverage area.

* * * * *